United States Patent
Grams

(10) Patent No.: US 11,425,310 B2
(45) Date of Patent: Aug. 23, 2022

(54) SEPARATION OF PROJECTION AND CAPTURE IN COLLABORATION ENVIRONMENT

(71) Applicant: Konica Minolta Business Solutions U.S.A., Inc., San Mateo, CA (US)

(72) Inventor: Jason James Grams, Westminster, CO (US)

(73) Assignee: Konica Minolta Business Solutions U.S.A., Inc., San Mateo, CA (US)

( * ) Notice: Subject to any disclaimer, the term of this patent is extended or adjusted under 35 U.S.C. 154(b) by 0 days.

(21) Appl. No.: 17/144,627

(22) Filed: Jan. 8, 2021

(65) Prior Publication Data

US 2022/0224817 A1      Jul. 14, 2022

(51) Int. Cl.
 *H04N 5/235* (2006.01)
 *G09G 3/00* (2006.01)

(52) U.S. Cl.
 CPC ........... *H04N 5/2353* (2013.01); *G09G 3/001* (2013.01)

(58) Field of Classification Search
 CPC .............................. H04N 5/2353; G09G 3/001
 USPC ............................................................ 345/7
 See application file for complete search history.

(56) References Cited

U.S. PATENT DOCUMENTS

| | | | |
|---|---|---|---|
| 8,045,060 B2 | 10/2011 | Cole et al. | |
| 9,544,504 B2 | 1/2017 | Rihn et al. | |
| 9,569,892 B2 | 2/2017 | Diaz Spindola et al. | |
| 9,961,315 B2 | 5/2018 | Junuzovic et al. | |
| 2013/0076853 A1* | 3/2013 | Diao | H04N 7/157 348/14.08 |
| 2016/0323553 A1* | 11/2016 | Fuchs | G03B 21/602 |
| 2018/0042692 A1 | 2/2018 | Kim et al. | |

FOREIGN PATENT DOCUMENTS

FR         2883988 A1        10/2006

OTHER PUBLICATIONS

Kunz et al. (Kunz A.M. et al. (2001) Novel Shutter Glass Control for Simultaneous Projection and Picture Acquisition; Immersive Projection Technology and Virtual Environments 2001. Eurographics; Springer, Vienna, https://doi.org/10.1007/978-3-7091-6221-7_26) (Year: 2001).*

* cited by examiner

*Primary Examiner* — Mark Edwards
(74) *Attorney, Agent, or Firm* — Osha Bergman Watanabe & Burton LLP

(57) ABSTRACT

An optical shutter device includes: a projection shutter disposed in front of a projection device that projects an AR image onto an object surface with a local content; an imaging shutter disposed in front of an image capturing device that captures a local image of the local content; and a controller that electrically drives the projection and imaging shutters and switches the optical shutter device between a projection state and an imaging state. In the projection state, the controller electrically drives: the projection shutter to an open state, and the imaging shutter to a closed state. In the imaging state, the controller electrically drives: the projection shutter to the closed state, and the imaging shutter to the open state.

15 Claims, 7 Drawing Sheets

FIG. 2A
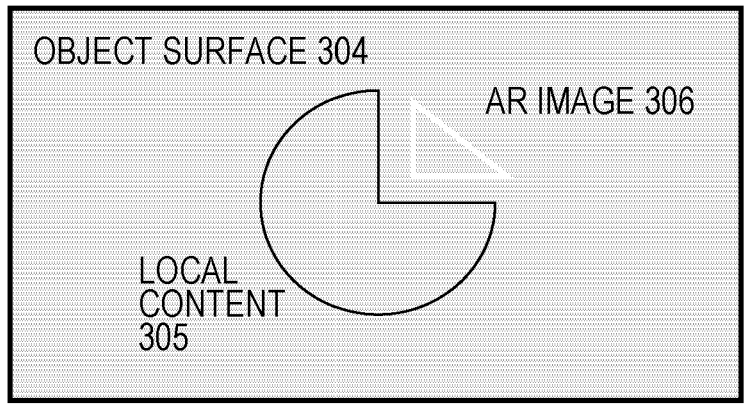
FIG. 2B
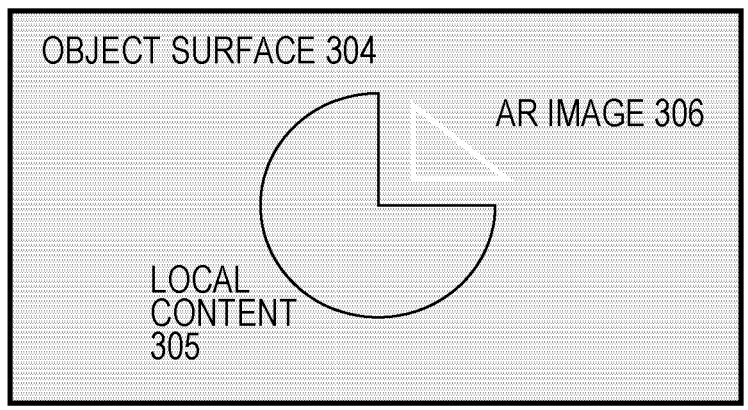
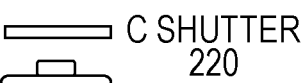

SEPARATION OF PROJECTION AND CAPTURE IN COLLABORATION ENVIRONMENT

BACKGROUND

Augmented Reality (AR) allows users to interact with computer-generated AR outputs overlaid on and/or around real objects in a workplace environment. For example, a dynamic and interactive AR environment has potential to be useful in business environments that require users to remotely collaborate with other users. However, generating and processing a collaborative AR environment may be computationally expensive when working with multiple integrated workplaces and/or high resolution AR content.

SUMMARY

In general, one or more embodiments of the invention relate to an optical shutter device. The optical shutter device comprises: a projection shutter disposed in front of a projection device that projects an augmented reality (AR) image onto an object surface with a local content; an imaging shutter disposed in front of an image capturing device that captures a local image of the local content; and a controller that electrically drives the projection and imaging shutters and switches the optical shutter device between a projection state and an imaging state. In the projection state, the controller electrically drives: the projection shutter to an open state such that the projection device projects the AR image through the open projection shutter, and the imaging shutter to a closed state such that the image capturing device is blocked from capturing the AR image. In the imaging state, the controller electrically drives: the projection shutter to the closed state such that the projection device projects the AR image onto the closed projection shutter, and the imaging shutter to the open state such that the image capturing device captures the local image without the AR image through the opened imaging shutter.

In general, one or more embodiments of the invention relate to a method for separating projection and capture in a collaboration environment. The method comprises: electrically driving projection and imaging shutters and switching an optical shutter device comprising the projection and imaging shutters between a projection state and an imaging state, wherein the projection shutter is disposed in front of a projection device that projects an augmented reality (AR) image onto an object surface with a local content, the imaging shutter is disposed in front of an imaging capturing device that captures a local image of the local content; in the projection state, electrically driving: the projection shutter to an open state such that the projection device projects the AR image through the open projection shutter, and the imaging shutter to a closed state such that the image capturing device is blocked from capturing the AR image; and in the imaging state, electrically driving: the projection shutter to the closed state such that the projection device projects the AR image onto the closed projection shutter, and the imaging shutter to the open state such that the image capturing device captures the local image without the AR image through the opened imaging shutter.

In general, one or more embodiments of the invention relate to a non-transitory computer readable medium (CRM) storing computer readable program code for separating projection and capture in a collaboration environment. The computer readable program code causes a computer to: electrically drive projection and imaging shutters and switch an optical shutter device comprising the projection and imaging shutters between a projection state and an imaging state, wherein the projection shutter is disposed in front of a projection device that projects an augmented reality (AR) image onto an object surface with a local content, the imaging shutter is disposed in front of an imaging capturing device that captures a local image of the local content; in the projection state, electrically drive: the projection shutter to an open state such that the projection device projects the AR image through the open projection shutter, and the imaging shutter to a closed state such that the image capturing device is blocked from capturing the AR image; and in the imaging state, electrically drive: the projection shutter to the closed state such that the projection device projects the AR image onto the closed projection shutter, and the imaging shutter to the open state such that the image capturing device captures the local image without the AR image through the opened imaging shutter.

Other aspects of the invention will be apparent from the following description and the appended claims.

BRIEF DESCRIPTION OF DRAWINGS

FIGS. 2A-2D each show an implementation example of one or more embodiments of the invention.

DETAILED DESCRIPTION

Figure 1:
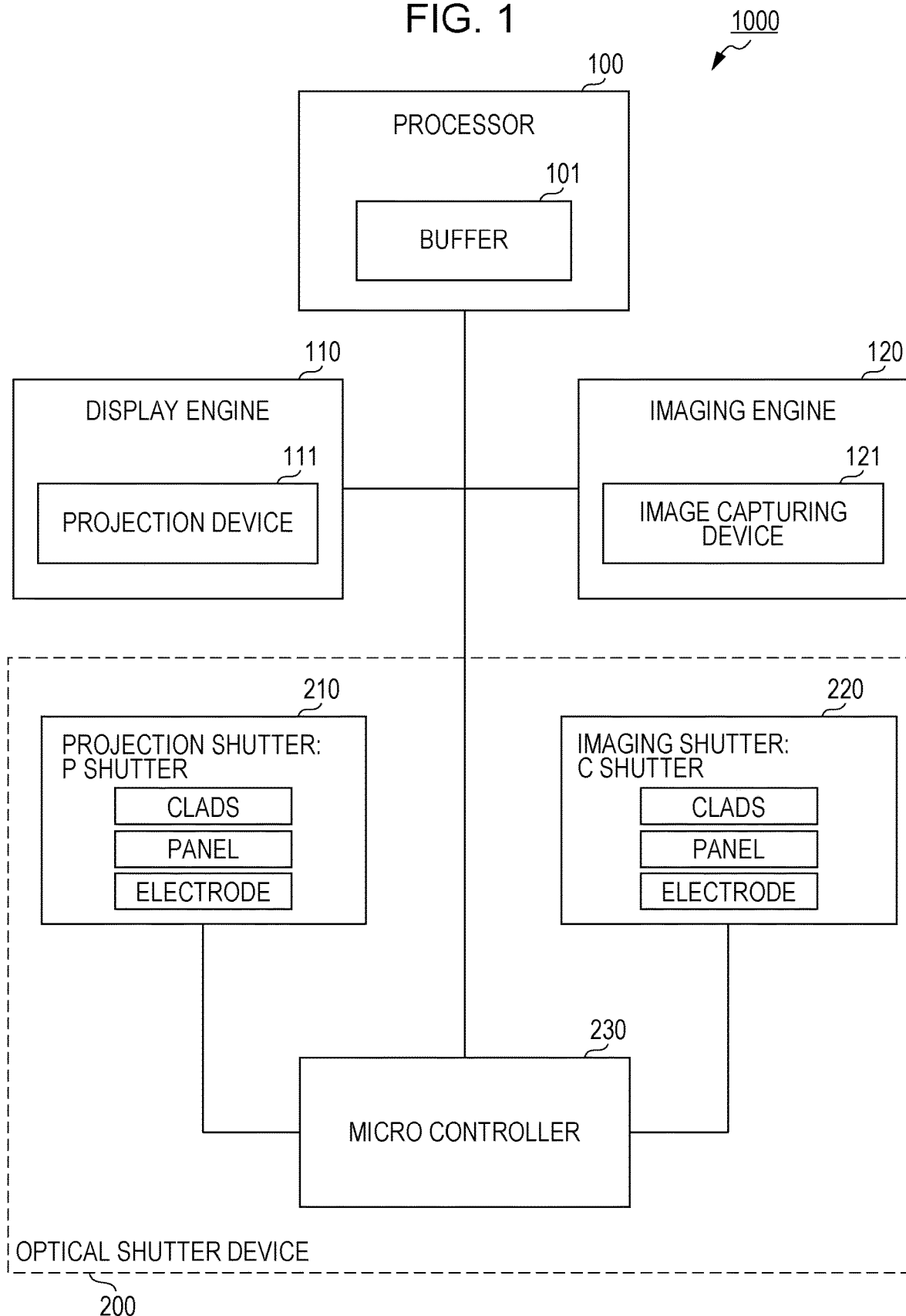
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third) may be used as an adjective for an element (i.e., any noun in the application). The use of ordinal numbers is not to imply or create a particular ordering of the elements nor to limit any element to being only a single element unless expressly disclosed, such as by the use of the terms "before," "after," "single," and other such terminology. Rather the use of ordinal numbers is to distinguish between the elements. By way of an example, a first element is distinct from a second element, and the first element may encompass more than one element and may succeed (or precede) the second element in an ordering of elements.

[System Overview]

In general, embodiments of the invention provide an optical shutter device, an optical shutter device operation method, and a non-transitory computer readable medium (CRM) for separating the actions of projection and capture in an AR collaboration environment. Specifically, separating the actions of projection and capture advantageously prevents the projected content from impacting the processing (e.g., content extraction, background filtering, improving image resolution, color correction, light correction, handling of overlapping projected content, text/object recognition, etc.) of an image captured by an image capturing device.

To achieve this separation of the projection and capture, in one or more embodiments, the optical shutter device switches between a projection state and an imaging state by controlling a first optical shutter (i.e., a projection shutter) disposed in front of a projection device and a second optical shutter (i.e., an imaging shutter) disposed in front of the image capturing device. In one or more embodiments, more than one optical shutter is disposed in front of each of the projection and image capturing devices.

In the projection state of the optical shutter device, the projection device projects an augmented reality (AR) image on or in a vicinity of a local content through the projection shutter while the imaging shutter blocks the image capturing device from capturing a local image of the local content. In one or more embodiments, the AR image is considered to be disposed within a vicinity of the local content if it is disposed on any area of the object surface that does not include the local content (i.e., no part of the AR image overlaps with any part of the local content). An example of an AR image disposed within a vicinity of the local content is shown below in reference to FIGS. 2A-2D.

In the imaging state, the projection shutter blocks the projected AR image while the imaging shutter allows the image capturing device to capture the local image. As a result, the projected AR image is never visible to the image capturing device despite being projected in the image capturing device's field of view.

According to one or more embodiments, the captured images being sent from one AR workplace to other AR workplaces do not need to include the projected AR image. Therefore, directly capturing images without the projected AR image advantageously eliminates the need for local computers at each AR workplace to execute complicated calculations and/or image processing algorithms to remove the projected AR image (or artefacts caused by the projected AR image) from the captured images. This advantageously results in improved functionality of the local computers through better allocation of processing resources.

In one or more embodiments, the AR image is projected, as a virtual content. The virtual content is overlaid on the local content or disposed within a vicinity of the local content. The local content may be text, drawing, and any other information written by a local user on an object surface. The object surface may be any type of physical surface (e.g., a surface of a desk, a piece of paper, a wall, a whiteboard, a blackboard, a floor, etc.).

The optical shutter device may be included in a system (1000) that shares images between at least two collaborating AR workplaces. For example, each system (1000) in these AR workplaces may comprise: the object surface with the local content; the optical shutter device; one or more projection devices (e.g., a projector) that project one or more AR images onto the local content; and one or more image capturing devices (e.g., a camera, a video camera, a webcam, etc.) that captures the local content. Advantageously, the system (1000) does not require specialized capture and projection equipment, which will be discussed in more detail below.

At each AR workplace, participant(s) may share ideas through displaying local content. The image capturing device may capture the local image of the local content and send the captured image to any of the participants at any other participating AR workplaces. For example, the captured image may be sent back to the participant(s) who originally created the local content and/or (via a network) to participant(s) at another AR workplace in a different physical location (e.g., a different room, a different building, etc.).

[System Structure]

FIG. 1 shows the system (1000) of one or more embodiments of the invention. As shown in FIG. 1, the system (1000) has multiple components, and may include, for example, a processor (100), a display engine (110), and an imaging engine (120). Each of these components (100, 110, 120) may be located on the same computing device (e.g., a personal computer (PC), laptop, tablet PC, smartphone, multifunction peripheral, kiosk, server, PIC device) or on different computing devices connected by a network of any size having wired and/or wireless segments. In one or more embodiments, the system (1000) further comprises an optical shutter device (200). Each of these components is discussed in further detail below.

The processor (100) comprises a buffer (101). The buffer (101) may be implemented in hardware (i.e., circuitry), software (e.g., executed in CPU, GPU, FPGA), or any combination thereof.

The buffer (101) may be configured to store the AR images to be projected by the projection device. The AR images may be generated at a local AR workplace or may be transmitted from a different AR workplace via a network (e.g., the Internet, local LAN connection, etc.). The AR images may be saved in the buffer (101) in any format (e.g., a JPEG image, a GIF image, a bitmap image, a TIFF image, a PDF document, etc.).

The buffer (101) may also be configured to store images of local content captured by the image capturing device (i.e., to store captured images). The captured images may be saved in the buffer (101) in any format (e.g., a JPEG image, a GIF image, a bitmap image, a TIFF image, a PDF document).

The system (1000) further comprises the display engine (110). The display engine (110) may be implemented in hardware (i.e., circuitry), software (e.g., executed in CPU, GPU, FPGA), or any combination thereof. The display engine (110) generates a projection of the AR images using one or more lights, effects, and/or images onto the object surface.

The display engine (110) may include a 2-dimensional and/or 3-dimensional projection device (111) (e.g., an LED, LCD, DLP, and/or laser-based projector) that projects a digital image onto the object surface. In one or more embodiments, the system (1000) may include more than one projection device (111) (e.g., two or more projection devices (111) may be utilized to project digital images from different angles, etc.). The display engine (110) may operate in visible and/or non-visible wavelength regimes (e.g., ultraviolet, visible, near infrared, infrared, etc.). Therefore, the display engine (110) can process the AR images using predetermined colors and patterns to render the projected AR images perceptible on the object surface. As a result, the color, texture, and/or appearance of the object surface is not limited to any specific types.

The system (1000) further comprises the imaging engine (120). The imaging engine (120) may be implemented in hardware (i.e., circuitry), software (e.g., executed in CPU, GPU, FPGA), or any combination thereof. The imaging engine (120) captures images of the object surface to generate images including the local content.

The imaging engine (120) may include a 2-dimensional and/or 3-dimensional image capturing device (121) (e.g., a camera, a video camera, a webcam, etc.) that captures a digital image of the local content on the object surface. In one or more embodiments, the system (1000) may include more than one image capturing device (121) (e.g., two or more image capturing devices (121) may be utilized to capture images of the local content from different angles, etc.). The imaging engine (120) may continuously capture images of the object surface. Alternatively, the imaging engine (120) may capture images the object surface at predetermined intervals set by a user of the system (1000).

[Optical Shutter Device]

In one or more embodiments, the system (1000) further comprises the optical shutter device (200). The optical shutter device (200) comprises: a projection shutter (210) (i.e., a P shutter) disposed in front of the projection device (111); and an imaging shutter (220) (i.e., a C shutter) disposed in front of the image capturing device (121); and a micro controller (230).

Each of the P and C shutters (210, 220) is a liquid crystal display (LDC) shutter that comprises: an LCD panel; two transparent media clads around the LCD panel; and one or more electrodes connected to the LCD panel and extending outside the transparent media clads. In one or more embodiments, the transparent media clads is made of glass.

In one or more embodiments, the P and C shutters (210, 220) are P shutter (210) is disposed such that a surface of the LCD panel of the P shutter (210) is orthogonal to a light direction from projection direction of the projection device (111). This reduces the possibility of distortion of the projected AR image as a result of refraction effects. Similarly, the C shutter (220) is disposed such that a surface of the LCD panel of the C shutter (220) is orthogonal and to a light direction to a direction of light entering the image capturing device (121), in order to reduce distortion of the captured image due to refraction effects.

The P and C shutters (210, 220) may be of any shape and size that is able to completely cover each of an aperture of the projection device (111) and a lens of the image capturing device (121). For example, the P and C shutters (210, 220) may each have a length of 1 to 3 inches. Furthermore, the P shutter (210) and the projection device (111) are disposed as close as possible (e.g., a few centimeters apart) to the extent which the heat from the projection device (111) (e.g., heat from a projection bulb of the projection device (111)) does not effect a performance of the P shutter (210). The C shutter (220) is disposed as close to the image capturing device (121) as possible to prevent a reflection of the image capturing device (121) from appearing on a surface of the C shutter (220). For example, the C shutter (220) is disposed directly in front of the image capturing device (121) with no gap between the C shutter (220) and the image capturing device (121). As another example, the C shutter (220) and the image capturing device may be disposed a few centimeters (e.g., less than 5) apart from one another.

The P shutter (210) may be switched between: a transparent state (i.e., an open state) that allows the projection device (111) to project the AR images; and an opaque state (i.e., a closed state) that blocks the projection device (111) from projecting the AR images.

The C shutter (220) may be switched between: a transparent state (i.e., an open state) that allows the image capturing device (121) to capture the image of the object surface; and an opaque state (i.e., a closed state) that blocks the image capturing device (121) from capturing the image of the object surface.

The micro controller (230) may be synchronized with the P and C shutters (210, 220) to periodically switch the P and C shutters (210, 220) between the transparent and opaque states by sending electric signals (i.e., a voltage or current signal) to the electrodes of the P and C shutters (210, 220) (i.e., by electrically driving the electrodes of the shutters). For example, when the current or voltage is applied to the electrodes of the P and C shutters (210, 220), the LCD panel of the shutters becomes opaque. Once the current is stopped, the LCD panel returns to a fully transparent state. In one or more embodiments, the P and C shutters (210, 220) is twisted nematic (TN) type LCD shutters that each requires 3 to 15 volts to switch from the transparent state to the opaque state. In one or more embodiments, the P and C shutters switch between the two states at a voltage of 5 volts.

The micro controller (230) may also control the P and C shutters (210, 220) independently from the actions of the projection device (111) and the image capturing device (121), which are mainly controlled by the processor (100). In other words, the P and C shutters (210, 220) may operate without additional input from other components (e.g., the processor (100)) of the system (1000). For example, the micro controller (230) and processor (100) share the same power source. Therefore, powering on the processor (100) would also power on the micro controller (230) and start the micro controller's (230) operation of the P and C shutters (210, 220). Alternatively, the P and C shutters (210. 220) may also be controlled by the processor (100) through commands sent from the processor (100) to the micro controller (230). For example, the P and C shutters (210, 220) are inactive until the micro controller (230) receives a command (e.g., a signal) from the processor (100) to begin operation of the P and C shutters (210, 220). The command may be sent at the start of a new collaboration session between two or more AR workplaces.

The micro controller (230) may drive the P and C shutters (210, 220) using a frequency of 30 Hz to 100 Hz. For example, the micro controller (230) may drive the P and C shutters (210, 220) at a frequency of 60 Hz. Alternatively, any type of LCD shutters that can be driven at a frequency higher than 100 Hz (e.g., up to 1000 Hz) may also be used.

Although the system (1000) is shown as having the above components (100, 110, 120, and 200), in other embodiments of the invention, the system (1000) has more or fewer components. Furthermore, the functionality of each of the above components may be shared among multiple components or performed by other components entirely. In addition, each of the components may be utilized multiple times in serial or parallel to carry out an iterative operation.

[Implementation Example of Switching Operation]

Figure 2C:
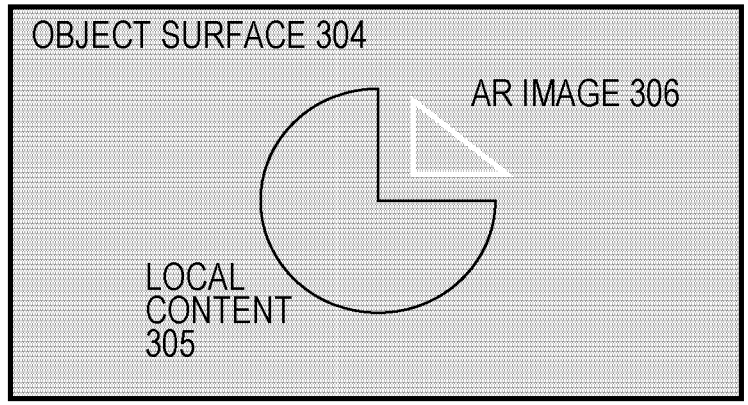

FIGS. 2A-2D each show an implementation example of one or more embodiments of the invention. As shown in FIG. 2A, an AR workplace (301) may include a projector (302), a camera (303), an object surface (304), a local content (305) on the object surface (304), and an AR image (306) projected on the object surface (304). In this example where there is no overlap between any part of the AR image with any part of the local content, the projector (302) is projecting the AR image (306) within a vicinity of the local content (305).

In one or more embodiments, the processor (100) (as discussed above in reference to FIG. 1) controls a brightness of the projector (302). The processor (100) may also control a frames per second (fps) (i.e., a frame rate), a gain, and/or an exposure time of the camera (303). For example, the processor (100) may adjust the frame rate to be lower than a frequency being applied to the P and C shutters (210, 220).

This adjustment compensates for a light amount reduced by the operations of the P and C shutters (210, 220). As a result, an impact of the reduced light amount on the captured images becomes negligible. The processor (100) may also increase the brightness of the projector (302) to compensate for the reduced light amount. The exposure time of the camera (303) may also be increased in order to reduce any impact that shutter transition might have on the captured images. In one or more embodiments, the exposure time ranges from between $1/10$ to $1/15$ of a second.

FIG. 2B shows the P shutter (210) disposed in front of the projector (302) and the C shutter (220) disposed in front of the camera (303). As shown in FIG. 2B, the P shutter (210) and C shutter (220) are both in the open state.

FIG. 2C shows the projection state of the optical shutter device (200) (as discussed above in reference to FIG. 1) where the P shutter (210) is in the open state while the C shutter (220) is in the closed state. In the projection state, the projector (302) is able to project the AR image (306) while the camera (303) is blocked from capturing the local content (305).

Figure 2D:
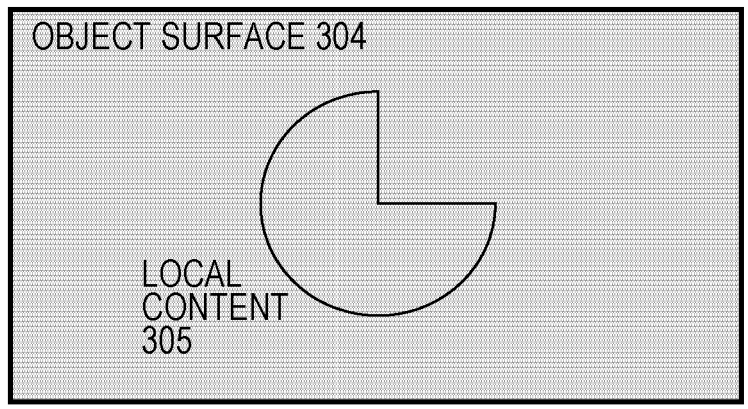

FIG. 2D shows the imaging state of the optical shutter device where the P shutter (210) is switched to the closed state while the C shutter (220) is switched to the open state. In the imaging state, the camera (303) is allowed to capture the local image of the local content (305) while the projector (302) is blocked from projecting the AR image (306). As a result, each of the captured images would only include the local content (305) without the AR image (306).

By excluding the AR image (306) from each of the captured images, one or more embodiments advantageously eliminate echoing and/or feedback effect while the captured images are being sent. Furthermore, one or more embodiments eliminate changes in color hue and intensity in the AR image (306) when a new layer of the AR image (306) is projected onto the object surface (304). Even further, eliminating the AR image (306) from each of the captured images reduces the size of each of the captured images. For example, eliminating the AR image can reduce the size of each captured image by more than half. This advantageously improves the usage of computer resources when sending multiple captured images during real-time information sharing between multiple AR workplaces. More specifically, during real-time information sharing, captured images may be sent at a rate of one image per second. Therefore, reducing the size of the captured images directly reduces the amount of computer resources necessary for executing and maintaining real-time information sharing.

Moreover, the projection of the AR image (306) may cause artefacts in areas without the local content (305) (e.g., on reflective surfaces such as white boards). For example, artefacts from reflections caused by reflective surfaces could show up on the captured images and block the actual local content (305). The blocking of the AR image (306) during the capture of the local content advantageously eliminates such artefacts.

In one or more embodiments, during real-time information sharing, the image capturing device (121) may be continuously (without stopping) capturing an image of the local content. For example, the local content is being live streamed to participants at other AR workplaces in real-time. The projection device (111) may also be continuously (without stopping) projecting the AR image. Finally, the optical shutter device (200) continuously switches between the projection state and the imaging state independent of the operations of the projection device (111) and the image capturing device (121). More specifically, the operations of the projection device (111) and image capturing device (121) do not control an operation of the P and C shutters (210, 220) (i.e., the microprocessor's (230) control of the P and C shutters is not based on the processor's (100) control of the projection device (111) and image capturing device (121)). For example, the P shutter (210) is not opened/closed based on a projection timing of the projection device (111). Similarly, the C shutter (220) is not opened/closed based on an image capturing timing of the image capturing device (121).

In such a real-time information sharing configuration, the projected AR image is only perceptible to the user and not to the image capturing device (121). In other words, even though the projected AR image is visible to the user, it will not show up in any images captured by the image capturing device (121). In such a scenario, a light blocking effect on the image capturing device (121) and associated flicker caused by opening/closing of the P and C shutters (210, 220) can be imperceptible to the user by driving the P and C shutters (210, 220) at certain frequencies. These frequencies are discussed in more detail below in reference to FIGS. 3 and 4.

Figure 3:
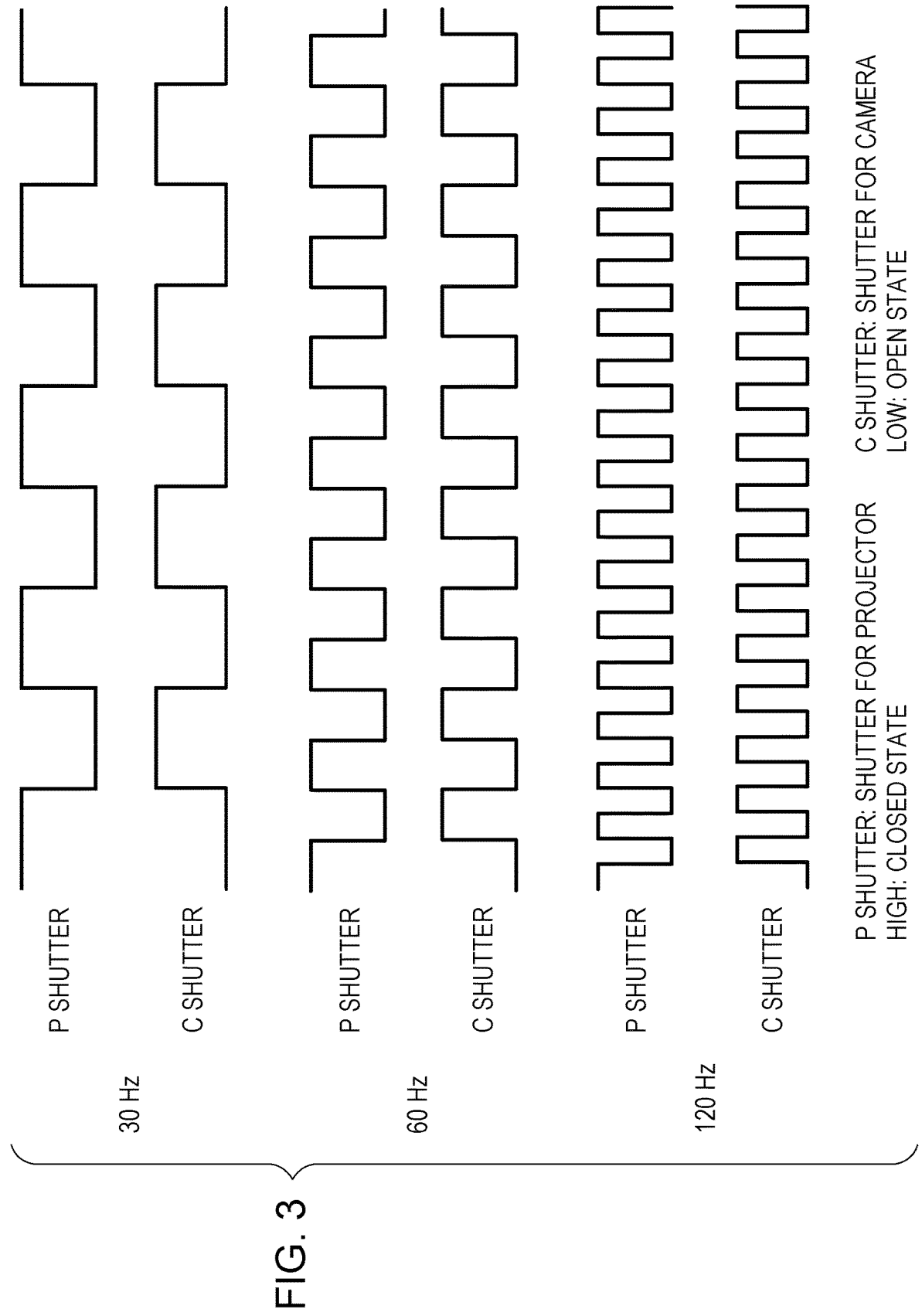
FIG. 3 shows a diagram in accordance with one or more embodiments of the invention.

FIG. 3 shows timing charts where the P and C shutters (210, 220) are driven at frequencies of 30 Hz, 60 Hz, and 120 Hz. The high state of each pulse indicates the closed (opaque) state of the P and C shutters (210, 220) while the low state indicates the open (transparent) state thereof. As shown in FIG. 3, for each frequency, a time period where the P shutter (210) is in the closed state is equal to a time period where the C shutter (220) is in the closed state. This time period may be, for example, 16 msec at a frequency of 30 Hz, 8 msec at a frequency of 60 Hz, and 4 msec for a frequency of 120 Hz.

Figure 4:
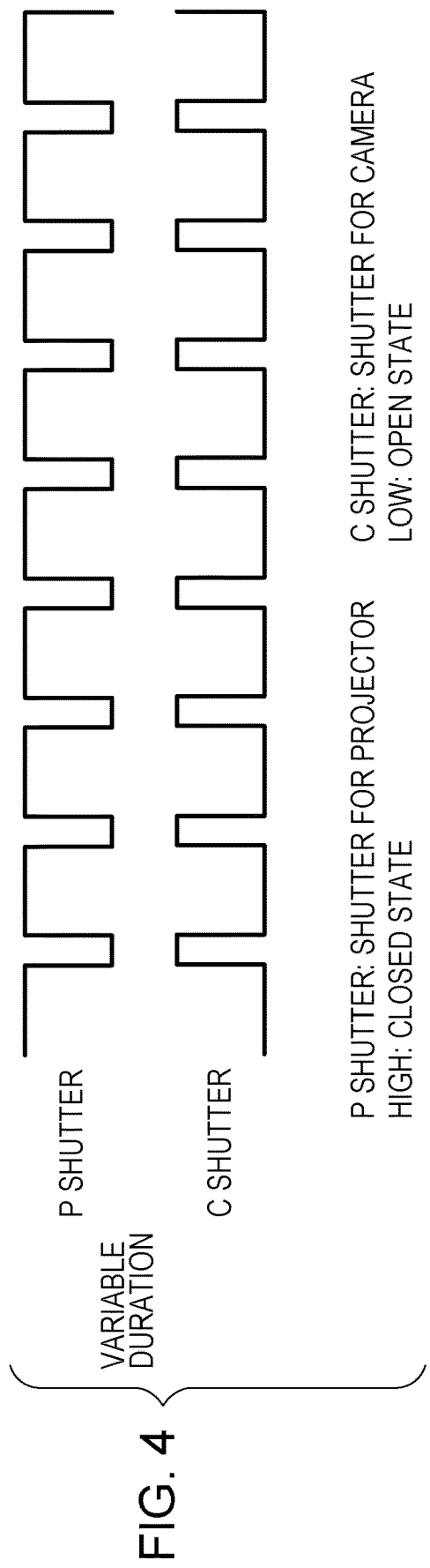
FIG. 4 shows a diagram in accordance with one or more embodiments of the invention.

FIG. 4 shows a timing chart where the P and C shutters (210, 220) are driven at frequencies different from those shown in FIG. 3. The high state of each pulse indicates the closed state of the P and C shutters (210, 220) while the low state of each pulse indicates the open state thereof. As shown in FIG. 4, the time period where the P shutter (210) is in the closed state is larger than the time period where the C shutter (220) is in the closed state. For example, the P shutter (210) is driven at a frequency of 40 Hz while the C shutter (220) is driven at a frequency of 120 Hz. This results in the time period where the P shutter (210) is in the closed state to be 12 msec and the time period where the C shutter (220) is in the closed state to be 4 msec. In this timing chart, the time period where the P shutter (210) is in the closed state is three times longer than the time period where the C shutter (220) is in the closed state, and vice versa. This timing allows more light to be exposed to the image capturing device (121). In another example (not illustrated), the time period where the C shutter (220) is open may be twice as long as the time period where the P shutter (210) is open.

Alternatively, the time period where the C shutter (220) is closed may be larger than the time period where the P shutter (210) is closed. In this case, the time period that the P shutter (210) is open becomes longer than the time period that the C shutter (220) is open. This allows the projection device (111) to project light for a longer time than a time that the image capturing device (121) is exposed to light, which reduces the impact of the light blocking effect on the image capturing device (121) to a brightness of projection perceived by the participant of the AR workplace. In one or more embodiments, the exposure time of the image capturing device (121) is adjusted accordingly to allow the image capturing device (121) to obtain more light to compensate for the light blocking effect.

[Switching Method]

Figure 5:
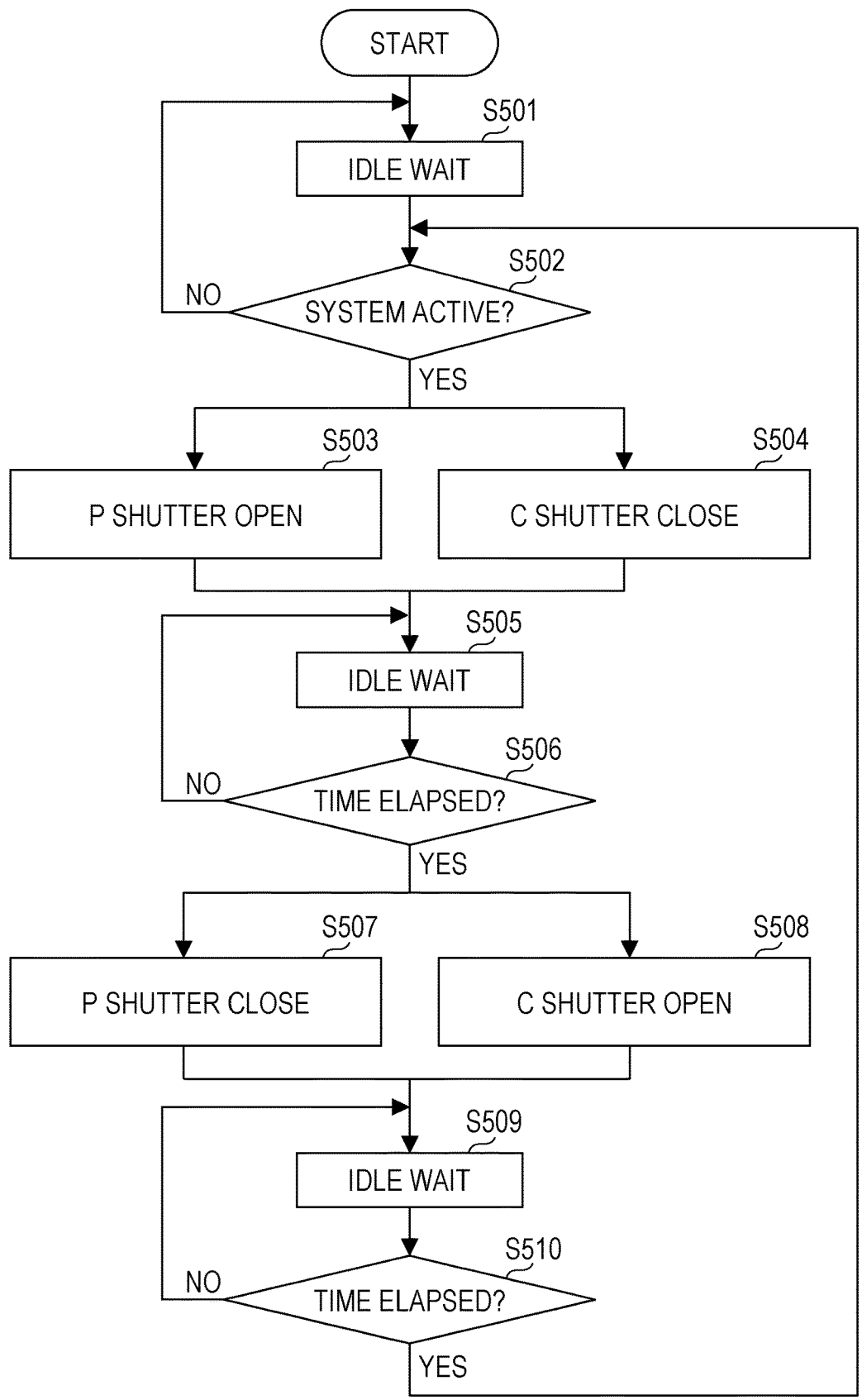
FIG. 5 shows a flowchart in accordance with one or more embodiments of the invention.

FIG. 5 shows a flowchart of a method of switching the P and C shutters (210, 220) in accordance with one or more embodiments of the invention. One or more of the individual processes in FIG. 5 may be performed by the system (1000) of FIG. 1, as described above. One or more of the individual processes shown in FIG. 5 may be omitted, repeated, and/or performed in a different order than the order shown in FIG. 5. Accordingly, the scope of the invention should not be limited by the specific arrangement as depicted in FIG. 5.

At S501, the optical shutter device (200) is in an idle state. At S502, the optical shutter device (200) determines whether the system (1000) has been activated. If the system (1000) has not been activated (S502: No), the optical shutter device (200) remains in the idle state (S501).

If the optical shutter device (200) determines that the system (1000) has been activated (S502: Yes), the optical shutter device (200) activates the projection state where the P shutter (210) is in the open state (S503) and the C shutter (220) is in the closed state (S504). In the projection state, the projection device (111) is allowed to project the AR image while the image capturing device (121) is blocked from capturing the local image.

At S505, the optical shutter device (200) returns to the idle state. At S506, the optical shutter device (200) determines whether a predetermined time has elapsed. If the predetermined time has not elapsed (S506: No), the optical shutter device (200) remains in the idle state (S505).

If the optical shutter device (200) determines that the predetermined time has elapsed (S506: Yes), the optical shutter device (200) activates the imaging state where the P shutter (210) is in the closed state (S507) and the C shutter (220) is in the open state (S508). In the imaging state, the projection device (111) is blocked from projecting the AR image while the image capturing device (121) is allowed to capture the image of the local content.

At S509, the optical shutter device (200) returns to the idle state. At S510, the optical shutter device (200) determines whether a predetermined time has elapsed. If the predetermined time has not elapsed (S510: No), the optical shutter device (200) returns to the idle state (S509). If the optical shutter device (200) determines that the predetermined time has elapsed (S510: Yes), the process returns to S502.

[Computing System]

Figure 6:
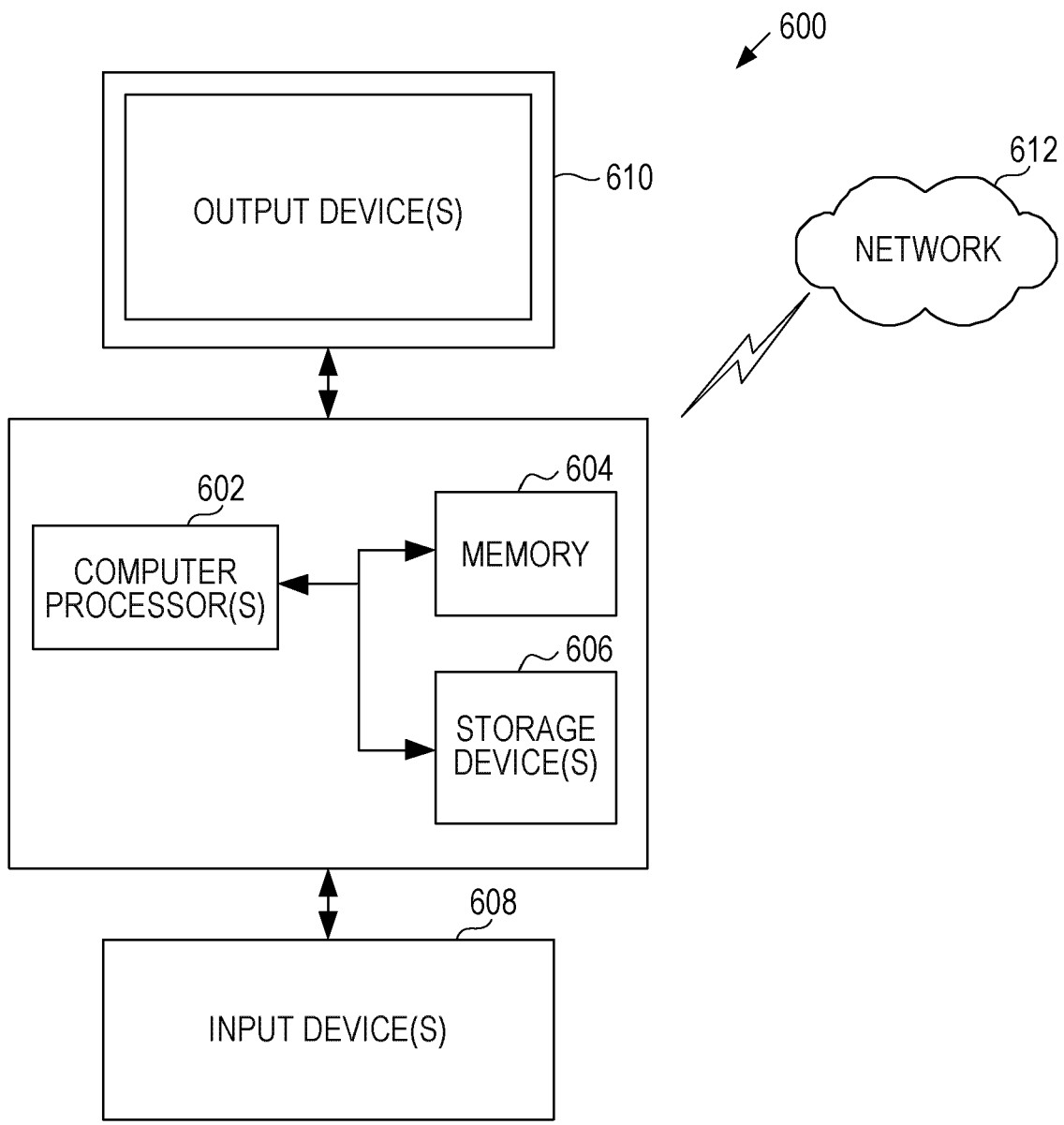
FIG. 6 shows a computing system in accordance with one or more embodiments of the invention.

Embodiments of the invention may be implemented on virtually any type of computing system, regardless of the platform being used. For example, the system (1000) may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 6, the computing system (600) may include one or more computer processor(s) (602), associated memory (604) (e.g., random access memory (RAM), cache memory, flash memory), one or more storage device(s) (606) (e.g., a hard disk, an optical drive such as a compact disk (CD) drive or digital versatile disk (DVD) drive, a flash memory stick), and numerous other elements and functionalities. The computer processor(s) (602) may be an integrated circuit for processing instructions. For example, the computer processor(s) (602) may be one or more cores, or micro-cores of a processor. The computing system (600) may also include one or more input device(s) (608), such as a camera, imager, touchscreen, keyboard, mouse, microphone, touchpad, electronic pen, or any other type of input device. Further, the computing system (600) may include one or more output device(s) (610), such as a projector, screen (e.g., a liquid crystal display (LCD), a plasma display, touchscreen, cathode ray tube (CRT) monitor, or other display device), a printer, external storage, or any other output device. One or more of the output device(s) (610) may be the same or different from the input device(s) (608). The computing system (600) may be connected to a network (612) (e.g., a local area network (LAN), a wide area network (WAN) such as the Internet, mobile network, or any other type of network) via a network interface connection (not shown). The input and output device(s) may be locally or remotely (e.g., via the network (612)) connected to the computer processor(s) (602), memory (604), and storage device(s) (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (600) may be located at a remote location and be connected to the other elements over a network (612). Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

[Improvements to Technology]

Embodiments of the invention may have one or more of the following improvements to image processing and image collaboration technology: the advantage of removing an AR image from a captured image without requiring complex, costly (namely, in terms of computer functionality and processing power), and time consuming image processing algorithms; the advantage of controlling the activation of the shutters without having to pre-calibrate the shutters; etc. Other advantages and improvements of one or more embodiments are discussed above with reference to FIGS. 1-5.

Although the disclosure has been described with respect to a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An optical shutter device comprising:
 a projection shutter disposed in front of a projection device that projects an augmented reality (AR) image on or in a vicinity of a local content written by a local user on an object surface;

an imaging shutter disposed in front of an image capturing device that captures a local image of the local content; and a controller that electrically drives the projection and imaging shutters and switches the optical shutter device between a projection state and an imaging state, wherein in the projection state, the controller electrically drives:

the projection shutter to an open state such that the projection device projects the AR image on or in a vicinity of the local content on the object surface through the open projection shutter, and the imaging shutter to a closed state such that the image capturing device is in an ON state but blocked from capturing the AR image, in the imaging state, the controller electrically drives:

the projection shutter to the closed state such that the projection device is in an ON state but blocked from projecting the AR image onto the object surface, and the imaging shutter to the open state such that the image capturing device captures the local image of the local content on the object surface without the AR image through the opened imaging shutter, the optical shutter device is switched between the projection and image states independent of operations of the projection and image capturing devices, and by repeatedly switching the optical shutter device between the projection state and the imaging state, the controller causes the AR image to be visible on the object surface without being captured by the image capturing device that captures the local image of the local content on the object surface.

2. The optical shutter device according to claim 1, wherein the controller is synchronized with the projection and imaging shutters and periodically switches the optical shutter device between the projection and imaging states.

3. The optical shutter device according to claim 1, wherein the controller drives the projection and imaging shutters at a frequency of equal to or greater than 60 Hz.

4. The optical shutter device according to claim 1, wherein a time period where the projection shutter is in the closed state is equal to a time period where the imaging shutter is in the closed state, and the time period is equal to or less than 8 msec.

5. A system comprising:

the optical shutter device according to claim 1, a projection device that projects the AR image on the local content;

an imaging capturing device that captures the local image of the local content; and a processor that controls the projection device and the imaging capturing device independently from the controller.

6. A method for separating projection and capture in a collaboration environment, comprising:

electrically driving projection and imaging shutters and switching an optical shutter device comprising the projection and imaging shutters between a projection state and an imaging state, wherein the projection shutter is disposed in front of a projection device that projects an augmented reality (AR) image on or in the vicinity of a local content written by a local user on an object surface, and, the imaging shutter is disposed in front of an imaging capturing device that captures a local image of the local content;

in the projection state, electrically driving:

the projection shutter to an open state such that the projection device projects the AR image on or in a vicinity of the local content on the object surface through the open projection shutter, and the imaging shutter to a closed state such that the image capturing device is in an ON state but blocked from capturing the AR image; and in the imaging state, electrically driving:

the projection shutter to the closed state such that the projection device is in an ON state but blocked from projecting the AR image onto the object surface, and the imaging shutter to the open state such that the image capturing device captures the local image of the local content on the object surface without the AR image through the opened imaging shutter, the optical shutter device is switched between the projection and image states independent of operations of the projection and image capturing devices, and wherein the method further comprises:

by repeatedly switching the optical shutter device between the projection state and the imaging state, causing the AR image to be visible on the object surface without being captured by the image capturing device that captures the local image of the local content on the object surface.

7. The method according to claim 6, wherein the electrically driving the projection and imaging shutters further comprises:

periodically switching the optical shutter device between the projection and imaging states.

8. The method according to claim 6, wherein the electrically driving of the projection and imaging shutters further comprises:

driving the projection and imaging shutters at a frequency of equal to or greater than 60 Hz.

9. The method according to claim 6, wherein a time period where the projection shutter is in the closed state is equal to a time period where the imaging shutter is in the closed state, and the time period is equal to or less than 8 msec.

10. The method according to claim 6, wherein the image capturing device is a camera, and the method further comprising:

controlling an exposure time of the camera within a range of $\frac{1}{10}$ to $\frac{1}{15}$ seconds.

11. A non-transitory computer readable medium (CRM) storing computer readable program code for separating projection and capture in a collaboration environment, the computer readable program code causing a computer to:

electrically drive projection and imaging shutters and switch an optical shutter device comprising the projection and imaging shutters between a projection state and an imaging state, wherein the projection shutter is disposed in front of a projection device that projects an augmented reality (AR) image on or in the vicinity of a local content written by a local user on an object surface, the imaging shutter is disposed in front of an imaging capturing device that captures a local image of the local content;

in the projection state, electrically drive:

the projection shutter to an open state such that the projection device projects the AR image on or in the vicinity of the local content on the object surface through the open projection shutter, and the imaging shutter to a closed state such that the image capturing device is in an ON state but blocked from capturing the AR image; and in the imaging state, electrically drive:

the projection shutter to the closed state such that the projection device is in an ON state but blocked from projecting the AR image onto the object surface, and the imaging shutter to the open state such that the image capturing device captures the local image of the local content on the object without the AR image through the opened imaging shutter, the optical shutter device is switched between the projection and image states independent of operations of the projection and image capturing devices, and wherein by repeatedly switching the optical shutter device between the projection state and the imaging state, the computer causes the AR image to be visible on the object surface without being captured by the image capturing device that captures the local image of the local content on the object surface.

12. The CRM according to claim 11, wherein the computer readable program code causes the computer to:
periodically switch the optical shutter device between the projection and imaging states.

13. The CRM according to claim 11, wherein the computer readable program code causes a computer to drive the projection and imaging shutters at a frequency of equal to or greater than 60 Hz.

14. The CRM according to claim 11, wherein
a time period where the projection shutter is in the closed state is equal to a time period where the imaging shutter is in the closed state, and
the time period is equal to or less than 8 msec.

15. The CRM according to claim 11, wherein
the image capturing device is a camera, and
the computer readable program code further causes a computer to:
control an exposure time of the camera within a range of $1/10$ to $1/15$ seconds.

* * * * *